Patented Oct. 10, 1950

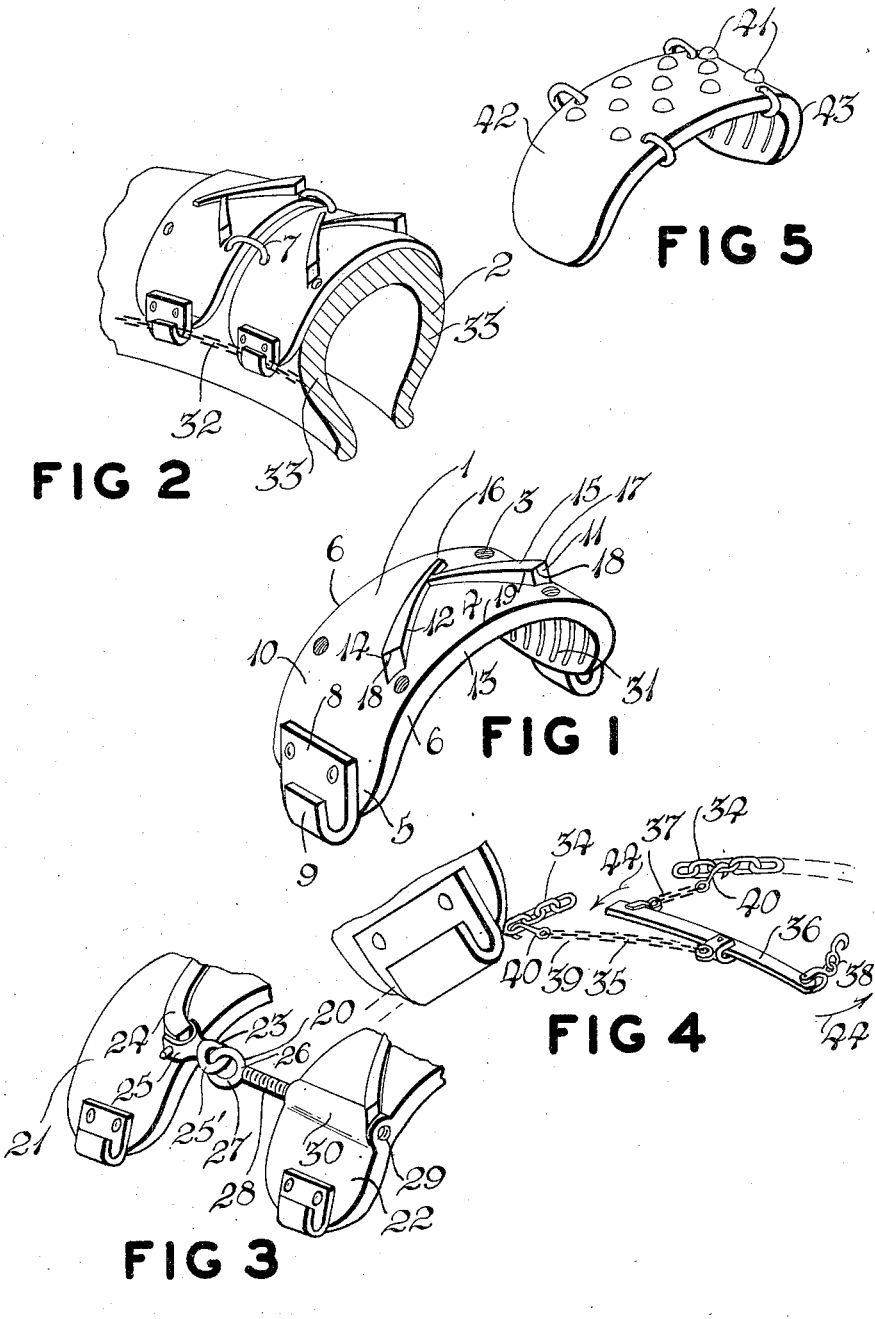

2,525,122

UNITED STATES PATENT OFFICE 2,525,122

TRACTION WHEEL GRIP

Orville Fletcher, 150 Mile House, British Columbia, Canada

Application November 8, 1948, Serial No. 58,891

2 Claims. (Cl. 152—228)

My invention relates to new and useful improvements in anti-skid devices for automobiles and the like, an object of my invention being to provide a device of the character herewithin described which will facilitate the adhesion between the wheels of a vehicle and the road surface.

A further object of my invention is to provide a device of the character herewithin described which may readily be assembled and dismantled from the tires of a vehicle without the use of tools.

A still further object of my invention is to provide a device of the character herewithin described which may be manufactured in various sizes to suit tires of any dimensions.

Another object of my invention is to provide a device of the character herewithin described which incorporates means for eliminating the objectionable relative movement between the tire of the vehicle and the anti-skid device.

Another object of my invention is to provide a device of the character herewithin described which incorporates an efficient and easily operated tensioning device which in conjunction with the foregoing object materially reduces abrasion of the tire by the anti-skid device.

A still further object of my invention is to provide a device of the character herewithin described which is economical in manufacture, simple in construction yet provides an efficient anti-skid assembly having the ability to obtain the maximum grip irrespective of the surface or condition of the road bed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a perspective view of one of my traction saddles.

Figure 2 is a fragmentary perspective sectional view of an automobile tire showing my traction saddles attached thereto.

Figure 3 is an enlarged, fragmentary perspective view of my method of connecting the terminal traction saddles.

Figures 4 is an enlarged perspective fragmentary view showing my chain tightening device.

Figure 5 is a perspective view of one of my traction saddles, showing an alternative form of tread construction, particularly suitable for small vehicles.

In the drawings like characters of reference indicate corresponding parts in the different figures.

Considerable difficulty is experienced in obtaining adequate traction between the road wheels of a vehicle and the road surface, particularly during the winter and spring months, when road conditions may vary from deep mud to solid ice. The conventional anti-skid chains, apart from causing excessive wear to the tires of the vehicle due to the lack of positive adhesion therebetween, have been found extremely inefficient under most conditions. In addition, they provide a relatively low factor of transverse adhesion, and, when operating over a surface of hard ice, may even increase the side-slipping tendencies, due to the relatively wide spacing of the individual sections of chain.

Consequently I have devised the traction saddles hereinafter to be described which may readily be assembled and dimantled from the wheels of the vehicle, and which incorporate means for tightening same around the perimeter of the tire, so as to eliminate the undesirable relative movement therebetween.

Proceeding therefore to describe my invention in detail, it will be seen upon reference to the accompanying drawings to comprise a plurality of metal plates or saddles 1 transversely curved in order to complement the external cross-sectional configuration of a conventional automobile tire 2. Apertures 3 are provided medially between the crest 4 and the ends 5 adjacent the transverse edges 6 by which the saddles may be adjacently connected together by means of the links 7. Chain receiving clips 8 are riveted to the ends 5 of the plates and curve upwardly to form the hook portions 9 for the purpose hereinafter to be described.

The saddles I have formed upon the outer surface 10 thereof, the treads 11, which in this embodiment include the main tread 12 situated diagonally across the crest 4 of the saddles and increasing in depth towards the front edge 13 thereof terminating with the major portion 14. The secondary tread 15 is situated diagonally opposite to the main tread 12 and extends from near the rear end 16 thereof to terminate in the major portion 14 of the tread 12. In this connection it should be noted that the upper edge 18 of the two treads should be in the same plane as the leading upper edge 19 of the saddle thus giving a three-point engagement with the ground surface.

Figure 3 of the accompanying drawings shows the removable connecting and tightening assemblies 20 between a pair of adjacent or terminal plates 21 and 22 and comprises the swivelling clevis and ring component 23 attached to the forward end of the tread 24. This component comprises the yoke 25 and the eye 25' extending through the yoke and being loosely riveted thereto in order to permit rotation thereof for the purpose hereinafter to be described.

The engaging portion 26 consists of a screw-threaded eye-bolt and comprises the eye 27 permanently engaged with the eye 25', and the threaded shank portion 28 engageable within the correspondingly internally screw-threaded sleeve 29. Sleeve 29 is formed transversely within the reinforcing portion 30 of the adjacent saddle 22 and is open-ended to allow the displacement of undesirable material which may be gathered therein during use.

It is desired that each saddle be provided with the transverse ribbing 31 on the undersurface thereof in order to prevent relative movement occurring between the saddle and the tire 2 during motion, thus eliminating severe abrasion occurring to the tread of the tire. In this connection it is considered that on relatively light vehicles the tightening assembly 20 will be sufficient to maintain the saddle in position, but upon heavier vehicles, movement may be further restrained by the inclusion of the tensioning chains 32 extending circumferentially upon each side of the tire adjacent the wall 33 thereof and engageable by the aforementioned chain clips 8.

The ends 34 of the chains 32 are united by means of the chain tightening device collectively designated 35 and best illustrated in Figure 4 of the accompanying drawings. The tightening device comprises the main lever 36 having the relatively short length of chain 37 connected to one end thereof. The engaging hook or locking component 38 is connected to the opposite end of the lever 36 and the relatively short length of chain 39 is connected at a position approximately midway between the ends of the lever. Hooks 40 are provided upon the distal ends of the chains 37 and 39 capable of engagement with the adjacent ends 34 of the main chain 32.

Figure 5 of the accompanying drawings shows an alternative form of tread 41 situated upon the external surface 42 of the saddle 43 and comprising a plurality of studs in staggered relationship. This is particularly adaptable for use with relatively light vehicles and may be assembled in a similar manner to the previously described embodiment, with the exception that it is not considered necessary to include the chain clips 8 and the tensioning chains 32.

Having therefore described my invention in detail, its method of application will now be presented. The saddles 1 are adjacently connected together by means of the links 7, the number of saddles and the curvature thereof being determined by the size of tires to which it is desired to fit the assemblies. When it is desired to attach the traction saddles to the tires, they should be laid out in advance or behind the four wheels of the vehicle substantially in alignment with the direction of travel thereof and the vehicle driven on to the saddles to a position approximately midway along their length.

The traction saddles may then be placed circumferentially around the tire, the two end or terminal saddles 21 and 22 being positioned as closely as possible with one another in order that the threaded portion 28 of the connecting and tightening assembly 20 may be engaged with the corresponding sleeves 29. The aforementioned swivelly connected eye 25' permits rotation of the threaded portions 28 thus tightening the saddles around the tire 1.

The tensioning chains 32 should then be placed within the hooks 9 of the chain clips 8 and the hooks 40 of the chain tightening assembly 25 engaged in convenient links within each end portion 34 of the chains and as far apart as possible. Movement of the lever 36 in the direction of the arrows 44 will cause the two ends 34 of the chain to be drawn tightly together, whereupon the locking component 38 may be engaged in an adjacent link of the chain 32 thus maintaining the tightening assembly 35 in the closed or locked position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A set of traction wheel grips for automobile tires and particularly truck and tractor tires comprising in combination a set of spaced linkedly connected traction saddles transversely embracing the associated tire tread in situ, a pair of spaced tightening assemblies, one on either side of the tire tread, each assembly consisting of a swivelling clevis and ring component connected to one saddle, an internally screw threaded sleeve upon the adjacent saddle and a screw-threaded eye-bolt engageable with said ring and said sleeve for binding said set upon said tire, a clip secured to the ends of each saddle, a tire wall circumscribing chain engageable with said clips, a lever having a length of chain secured at a point medially upon the length thereof and another length secured upon one end thereof, each length having a hook upon its free end attachable to selected links on said tire circumscribing chain substantially as described, and a locking component on the other end of said lever also engageable with said tire circumscribing chain for the purpose herein specified.

2. A set of traction wheel grips for automobile tires and particularly truck and tractor tires comprising in combination a set of spaced linkedly connected traction saddles transversely embracing the associated tire tread in situ, a clip secured to the ends of each saddle, a tire wall circumscribing chain engageable with said clips and tightening means on said chain, for the purpose herein specified, said tightening means consisting of a lever having a length of chain secured at a point medially upon the length thereof and another length secured upon one end thereof, each length having a hook upon its free end attachable to selected links on said tire circumscribing chain substantially as described, and a locking component on the other end of said lever also engageable with said tire circumscribing chain.

ORVILLE FLETCHER.

REFERENCES CITED

The following references are of record in the file of this patent:

UNITED STATES PATENTS

| Number | Name | Date |
|---|---|---|
| 1,291,116 | Pinckney | Jan. 14, 1919 |
| 1,321,032 | Haddorff | Nov. 4, 1919 |
| 1,460,657 | Kintz | July 3, 1923 |
| 1,525,977 | Biver | Feb. 10, 1925 |